(12) United States Patent
Ford

(10) Patent No.: US 6,470,297 B1
(45) Date of Patent: Oct. 22, 2002

(54) METHOD OF MULTI-DIMENSIONALLY ACCENTUATING A DEVIATION IN INFORMATION AND IDENTIFYING ITS CAUSE

(75) Inventor: David K. Ford, Crofton, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 259 days.

(21) Appl. No.: 09/598,845

(22) Filed: Jun. 21, 2000

(51) Int. Cl.[7] .............................................. G06F 101/14
(52) U.S. Cl. ........................ 702/179; 702/180; 702/181
(58) Field of Search ................................. 702/179, 180, 702/181

(56) References Cited

U.S. PATENT DOCUMENTS

| | | | |
|---|---|---|---|
| 5,278,901 A | 1/1994 | Shieh et al. |
| 5,557,742 A | 9/1996 | Smaha et al. |
| 5,621,889 A | 4/1997 | Lermuzeaux et al. |
| 5,796,942 A | 8/1998 | Esbensen |
| 5,931,946 A | 8/1999 | Terada et al. |
| 5,991,881 A | 11/1999 | Conklin et al. |

OTHER PUBLICATIONS

Claude Shannon, "A Mathematical Theory of Communication", 1948, Bell System Technical Journal, vol. 27, No. 4, pp. 379–423, 623–656.

*Primary Examiner*—John S. Hilten
*Assistant Examiner*—Stephen J. Cherry
(74) *Attorney, Agent, or Firm*—Robert D. Morelli

(57) ABSTRACT

The present invention is a method of accentuating a deviation in a set of information and locating a cause thereof that includes the steps of receiving a set of information; selecting a subset of information; setting initial states; setting transition states; initializing a vector; selecting the first information segment; modifying the vector if the information segment contains an initial and transition state, otherwise stopping; selecting the next available information segment and returning to the previous step, otherwise recording a number of occurrences of each unique vector; determining the number of the least occurring vector; dividing each occurrence number by the least occurring number; determining an occupation time for each vector; calculating an inverse characteristic time for each unique vector; calculating at least one subset value for the subset of information using a temperature-based function, an entropy-based function, an energy-based function, or any combination thereof; setting a value $v_i$ for each initial and transition state; calculating a configuration value for each initial and transition state; selecting the subset of information then is available and next in sequence and returning to the vector modification step for further processing, otherwise plotting the subset and configuration values; finding a difference, if any, in the plotted values; and finding the information segments that correspond to the difference.

22 Claims, 1 Drawing Sheet

METHOD OF MULTI-DIMENSIONALLY ACCENTUATING A DEVIATION IN INFORMATION AND IDENTIFYING ITS CAUSE

FIELD OF THE INVENTION

The present invention relates, in general, to data processing with respect to measuring, calibrating, or testing, and, in particular, to waveform analysis.

BACKGROUND OF THE INVENTION

The study of the effects of a transmission channel on a message transmitted there through and the methods developed to minimize such effects came to be known as the field of information theory. Claude E. Shannon, in a paper entitled "A Mathematical Theory of Communication," published in 1948 in *Bell System Technical Journal*, vol. 27, no. 4, pp. 379–423,623–656, introduced the concept of entropy in information theory. A message, prior to transmission, may be described as comprising n message elements $x_i$, where i is an integer from 1 to n. The measure of the amount of information contained in the $i^{th}$ message element $x_i$ is defined as follows;

$$I(x_i) = \log 1/p(x_i) = -\log p(x_i),$$

where $p(x_i)$ is the probability of occurrence of the $i^{th}$ message element $x_i$. The expected value of $I(x_i)$ is defined as follows.

$$H(X) = \sum_{i=1}^{n} p(x_i) I(x_i) = -\sum_{i=1}^{n} p(x_i) \log p(x_i)$$

$H(X)$ is called the entropy distribution of $p(x_i)$ at the transmission source. If $p(x_i)$ is interpreted as the probability of the $i^{th}$ state of a system in phase space then $H(X)$ is identical to the entropy of statistical mechanics and thermodynamics. In statistical mechanics, entropy is a measure of system disorder. In information theory, entropy is a measure of the uncertainty associated with a message source. The entropy at the destination of the transmission may be defined analogously as follows.

$$H(Y) = \sum_{i=1}^{n} p(y_i) I(y_i) = -\sum_{i=1}^{n} p(y_i) \log p(y_i)$$

With the proliferation of communication channels on a global scale, information theory has grown to include research to not only preserve the integrity of a message transmitted over a communication network but also to preserve the integrity of the communication network itself. U.S. Pat. No. 5,278,901, entitled "PATTERN-ORIENTED INTRUSION-DETECTION SYSTEM AND METHOD"; U.S. Pat. No. 5,557,742, entitled "METHOD AND SYSTEM FOR DETECTING INTRUSION INTO AND MISUSE OF A DATA PROCESSING SYSTEM"; U.S. Pat. No. 5,621,889, entitled "FACILITY FOR DETECTING INTRUDERS AND SUSPECT CALLERS IN A COMPUTER INSTALLATION AND A SECURITY SYSTEM INCLUDING SUCH A FACILITY"; U.S. Pat. No. 5,796,942, entitled "METHOD AND APPARATUS FOR AUTOMATED NETWORK-WIDE SURVEILLANCE AND SECURITY BREACH INTERVENTION"; U.S. Pat. No. 5,931,946, entitled "NETWORK SYSTEM HAVING EXTERNAL/INTERNAL AUDIT SYSTEM FOR COMPUTER SECURITY"; and U.S. Pat. No. 5,991,881, entitled "NETWORK SURVEILLANCE SYSTEM," each disclose a device and/or method of preserving the integrity of a communication network through the detection of intrusion and/or misuse of the communication network. However, none of these patents disclose a method of multi-dimensionally accentuating a deviation in a transmitted message and identifying the cause thereof as does the present invention. U.S. Pat. Nos. 5,278,901; 5,557,742; 5,621,889; 5,796,942; 5,931,946; and 5,991,881 are hereby incorporated by reference into the specification of the present invention.

SUMMARY OF THE INVENTION

It is an object of the present invention to multi-dimensionally accentuate any deviation in information and identify the cause thereof.

It is another object of the present invention to multi-dimensionally accentuate any deviation in information and identify the cause thereof by reducing to a manageable level the amount of information presented to a user.

It is another object of the present invention to multi-dimensionally accentuate any deviation in information and identify the cause thereof by reducing to a manageable level the amount of information presented to a user and describing the information with an entropy-based function, a temperature-based function, an energy-based function, or any combination of functions thereof.

The present invention is a method of multi-dimensionally accentuating any deviation in information and identifying the cause thereof by reducing to a manageable level the amount of information presented to a user and describing the information with an entropy-based function, a temperature-based function, an energy-based function, or any combination of functions thereof.

The first step of the method is receiving a set of information.

The second step of the method is selecting a subset of information from the set of information.

The third step of the method is defining initial states of interest.

The fourth step of the method is defining transition states of interest.

The fifth step of the method is initializing a vector and recording the same.

The sixth step of the method is selecting the first information segment.

The seventh step of the method is modifying the vector if the information segment contains an initial and transition state, otherwise stopping.

The eighth step of the method is selecting the next available information segment and returning to the seventh step for further processing, otherwise proceeding to the next step.

The ninth step of the method is recording a number of occurrences of each unique vector.

The tenth step of the method is determining the number of the least occurring vector.

The eleventh step of the method is dividing each occurrence number by the least occurring number.

The twelfth step of the method is determining an occupation time for each vector.

The thirteenth step of the method is calculating an inverse characteristic time for each unique vector.

The fourteenth step of the method is calculating at least one subset value for the subset of information using a temperature-based function, an entropy-based function, an energy-based function, or any combination thereof, The fifteenth step of the method is setting a value $v_i$ for each initial and transition state.

The sixteenth step of the method is calculating a configuration value for each initial and transition state.

The seventeenth step of the method is selecting the subset of information then is available and next in sequence and returning to the vector modification step for further processing, otherwise proceeding to the next step.

The eighteenth step of the method is plotting the subset and configuration values.

The nineteenth step of the method is finding differences, if any, in the plotted values, The twentieth, and last, step of the method is finding the information segments that correspond to the differences, if any.

DETAILED DESCRIPTION

Figure 1:
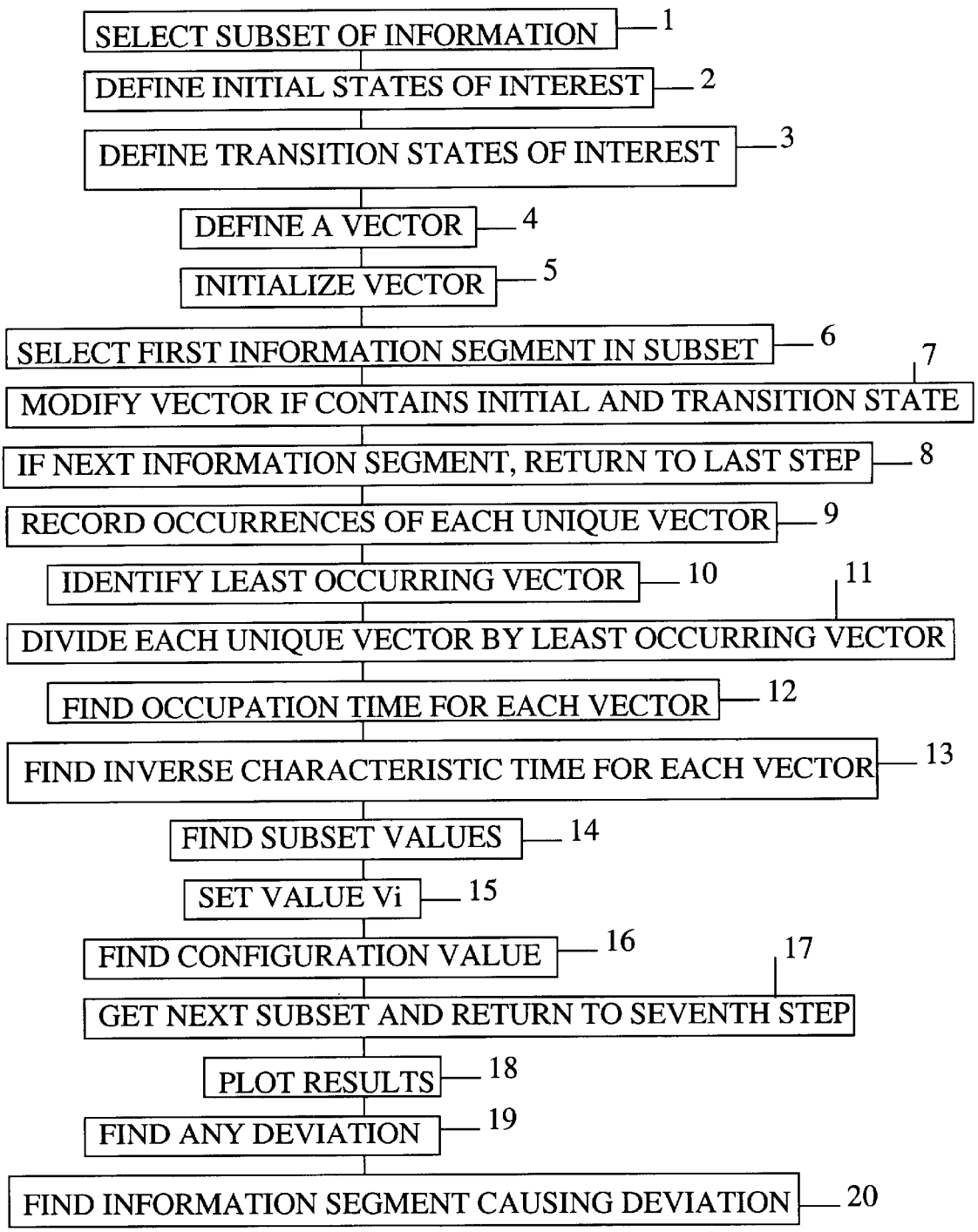
FIG. 1 is a list of the steps of the present invention.

The present invention is a method of accentuating a deviation in a set of information and locating a cause of the deviation. The information may be of any type that can be arranged in a sequence (e.g., Internet Protocol traffic (IP), financial data, seismic data, etc.).

FIG. 1 is a list of the steps of the method of the present invention The first step 1 of the method is receiving a set of information, where the set of information is in a sequence. The second step 2 of the method is selecting a subset of information from the set of information, The first subset of information includes at least one information segment in a sequence. In the preferred embodiment, the sequence is in units of time. In an alternative embodiment, the sequence may be in units of magnitude, frequency and so on. Each at least one information segment includes an initial state and a transition state. The initial state of an information segment represents the initial condition of the information segment, whereas the transition state represents the final condition to which the information segment is to achieve. Terms that may be used to characterize an initial state and/or a transition state of an information segment include the source of origination (e.g., physical location, sender type, etc.); the destination (e.g., physical location, sender type, etc.); the protocols employed (e.g., IP, TCP, etc.); the number of recipients; data types; magnitudes of any data type (i.e., data values such as wattage, tonnage, dollar amount, etc.); stimulus type (i.e., whether or not the information is a stimulus); response type (i.e., whether or not the information segment is a response type); bit size (e.g., particular bit size, greater than a particular bit size, less than a particular bit size, etc.); duration (e.g., time duration); change in any characteristic listed above from an initial state to the corresponding transition state, and any combination thereof. Data type depends on the context of the information segment (e.g., financial, commodity, internet, etc.). The present invention applies to all types of data.

The third step 3 of the method is [defining] setting at least one initial state of interest to a user. In the third step 3, the user [defines] sets the type of information segments that the user is interested in seeing. Any information segment that does not include at least one of the initial states set by the user will not be processed. Each at least one initial state includes at least one user-definable characteristic as described above. An initial state may be uni-dimensional or multi-dimensional. A dimension may be a value or a function. A function may be related or unrelated to one or more of the initial state characteristics defined above.

The fourth step 4 of the method is defining at least one transition state of interest to the user.

In the fourth step 4, the user further sets the type of information segments that the user is interested in seeing. Any information segment that does not include at least one of the transition states set by the user will not be processed. Each at least one transition state includes at least one user-definable characteristic as described above. A transition state may be uni-dimensional or multi-dimensional. A dimension may be a value or a function. A function may be related or unrelated to one or more of the transition state characteristics defined above.

The fifth step 5 of the method is initializing a vector and recording the same. The vector includes a number of entries that are equal in number to, and correspond with, the at least one initial state and the at least one transition state set in the third step 3 and the fourth step 4. That is, the vector is a vector of the initial and transition states. Each entry in the vector is defined in the same manner as the state to which it corresponds (e.g., dimension). The vector is initialized by setting an initial value for each entry and each at least one dimension in the vector.

The sixth step 6 of the method is selecting the at least one information segment in the subset of information that is first in sequence (e.g., first in time as received).

If the at least one information segment selected in the sixth step 6 contains both one of the at least one initial state and one of the at least one transition state as defined in the third step 3 and the fourth step 4 then the seventh step 7 is modifying the vector recorded last and recording the modified vector. If this condition is not met then the present method is stopped. In an alternate embodiment, all information segments may be processed by automatically determining the initial states and the transition states contained therein and automatically generating the vector accordingly.

The vector may be modified in a number of different ways. In the preferred embodiment, either the entry in the vector that corresponds to the at least one initial state or the entry in the vector that corresponds to the at least one transition state is incrementing. In an alternate embodiment, the entry in the vector that corresponds to the at least one initial state is decremented, and the entry in the vector that corresponds to the at least one transition state is incremented. Furthermore, the modified vector may be bounded by a number of functions. In the preferred embodiment, a modulo reduction by a positive integer is applied to the modified vector. In an alternate embodiment, an absolute-value function may be applied to the modified vector. In a second alternate embodiment, a function that prevents the modified vector from being decremented below the value of zero may be employed.

If the subset of information contains at least one information segment that has not been processed then the eighth step 8 of the method is selecting the at least one information segment in the subset of information that is next in sequence and returning to the seventh step 7 for processing. If this condition is not met then proceeding to the next step.

The ninth step 9 of the method is recording a number of occurrences of each unique vector from the vectors recorded.

The tenth step 10 of the method is identifying the number of occurrences of the least occurring unique vector.

The eleventh step 11 of the method is dividing each result of the ninth step 9 by the result of the tenth step 10.

The twelfth step 12 of the method is calculating an occupation time for each vector recorded. In the preferred embodiment, occupation time is determined by assigning one unit of time as the occupation time for each vector recorded. In an alternate embodiment, occupation time is determined by assigning a time equal to an actual elapsed time between the recorded vector and the previously recorded vector. In a second alternative embodiment, occupation time is determined by assigning a time that is a function of an actual elapsed time between the recorded vector and the previously recorded vector and the size of the corresponding at least one information segment as the occupation time for each vector recorded.

The thirteenth step 13 of the method is calculating an inverse characteristic time for each unique vector as follows:

$$q_i = \frac{\pi_i}{\left(w\sum_{i=1}^{n} t_i\right)}$$

where w is a weighting factor, where $t_i$ is the corresponding result of the twelfth step 12, and where $\pi_i$ is the corresponding result of the eleventh step 11. The weighting factor may be a constant or a function.

The fourteenth step 14 of the method is calculating at least one subset value for the subset of information using a function selected from the group of functions consisting of a temperature-based function, an entropy-based function, an energy-based function, and any combination thereof. One subset value is produced by each function.

The entropy based function is as follows:

$$S = \sum_{i=1}^{n} \frac{\left(\frac{\pi_i}{q_i}\right)}{\sum_{i=1}^{n}\left(\frac{\pi_i}{q_i}\right)} \log\left(\frac{\sum_{i=1}^{n}\left(\frac{\pi_i}{q_i}\right)}{\left(\frac{\pi_i}{q_i}\right)}\right)$$

where $\pi_i$ is the corresponding result of the eleventh step 11, where $q_i$ is the corresponding result of the thirteenth step 13, and where n is the total number of information segments in the subset of information being processed. The energy-based function is as follows:

$$U = T\sum_{i=1}^{n} \frac{\left(\frac{\pi_i}{q_i}\right)}{\sum_{i=1}^{n}\left(\frac{\pi_i}{q_i}\right)} \log\left(\left(\prod_{i=1}^{n}\left(\frac{\pi_i}{q_i}\right)\right)^{1/n} / \left(\frac{\pi_i}{q_i}\right)\right)$$

where $\pi_i$ is the corresponding result of the eleventh step 11, where $q_i$ is the corresponding result of the thirteenth step 13, and where n is the total number of information segments in the subset of information being processed.

The temperature-based function is as follows:

$$\left(\sum_{i=1}^{n}\left(\frac{\pi_i}{q_i}\right)^{1/\phi}\right) / \sum_{i=1}^{n}\left(\frac{1}{q_i}\right)^{1/\phi} \times \left(\frac{\pi_i}{q_i}\right)^{1/\phi} / \left(\sum_{i=1}^{n}\left(\frac{\pi_i}{q_i}\right)^{1/\phi}\right) =$$

-continued $$\left(\sum_{i=1}^{n}\frac{\pi_i'}{q_i'}\right) / \sum_{i=1}^{n}\frac{1}{q_i'} \times \frac{\pi_i'}{q_i'} / \left(\sum_{i=1}^{n}\left(\frac{\pi_i'}{q_i'}\right)\right)$$

where $\pi_i$ is the corresponding result of the eleventh step 11, where $q_i$ is the corresponding result of the thirteenth step 13, where n is the total number of information segments in the subset of information being processed, where $\phi$ is a factor that indicates the percentage change in temperature between the subset of information being processed and the last subset of information processed; where $\pi'_i$ is the corresponding result of the eleventh step 11 for the previously processed subset of information, and where $q'_i$ is the corresponding result of the thirteenth step 13 for the previously processed subset of information. For the first subset of information processed for which there is no previous subset of information, the user must assume an initial value (e.g., temperature) for the right half of the equation above. The user may choose any initial temperature because the important characteristic is the temperature difference, or deviation, from subset of information to subset of information and not an absolute temperature for the subsets. The equation above is solved for $\phi$ using an iterative method such as Newton's method. Once $\phi$ is determined, the temperature of the subset of information being processed may be determined as $T_i = \phi T_{i-1}$, where i is an integer from 1 to n, where n is the number of subsets of information processed, and where $T_{i-1}$ is the temperature of the last subset of information processed. For the first subset of information processed, the user must assume a value for $T_0$ only. Thereafter, a temperature value for the last subset of information processed will exist.

The fifteenth step 15 of the method is setting a value $v_i$ for each at least one initial state and each at least one transition state defined in the third step 3 and the fourth step 4.

The sixteenth step 16 of the method is calculating a configuration value for each at least one initial state and each at least one transition state defined in the third step 3 and the fourth step 4 as follows.

$$Y_i = v_i \times \left(\left(\frac{\pi_i}{q_i}\right) / \left(\sum_{i=1}^{n}\frac{\pi_i}{q_i}\right)\right)$$

The seventeenth step 17 of the method is selecting the subset of information that is available and next in sequence and returning to the seventh step 7 for further processing. If another subset of information is not available then proceeding to the next step. In the preferred embodiment, the next subset of information is selected by selecting a subset of information of the same time duration as the first subset of information so that the newly selected subset of information overlaps the previously selected subset of information in all respects except for the first information segment in the previously selected subset of information. However, other selection schemes are possible (e.g., non-overlapping but contiguous, non-overlapping and non-contiguous, etc.). In an alternate embodiment, the user may limit the number of subsets of information processed to a user-definable number.

The eighteenth step 18 of the method is plotting the results of the fourteenth step 14 and the sixteenth step 16. In the preferred embodiment, the results of the fourteenth step 14 are plotted on a first plot and the results of the sixteenth step 16 are plotted on a second plot.

The nineteenth step 19 of the method is identifying any deviation in the plots of the eighteenth step 18. In the preferred embodiment, the user obtains empirical data to establish what is typical behavior and what constitutes a deviation therefrom.

The twentieth step 20 of the method is identifying the at least one information segment that corresponds to the deviation identified in the nineteenth step 19.

What is claimed is:

1. A method of accentuating a deviation in a set of information and locating a cause thereof, comprising the steps of:

a) receiving the set of information, where the set of information is in a sequence;

b) selecting a subset of information from the set of information, where the first subset of information includes at least one information segment in a sequence, and where each at least one information segment includes an initial state and a transition state;

c) setting at least one user-definable initial state, where each at least one user-definable initial state includes at least one user-definable characteristic;

d) setting at least one user-definable transition state, where each at least one user-definable transition state includes at least one user-definable characteristic;

e) initializing a user-definable vector and recording the initialized user-definable vector, where the user-definable vector has a number of entries equal, and corresponding, to the at least one initial state and the at least one transition state set in steps (c) and (d), and where each entry in the user-definable vector has at least one dimension;

f) selecting the at least one information segment in the subset of information that is first in sequence;

g) if the at least one information segment selected in the last step contains both one of the at least one initial state and one of the at least one transition state set in steps (c) and (d) then modifying in a user-definable manner the user-definable vector recorded last and recording the modified user-definable vector, otherwise stopping;

h) if the subset of information contains at least one information segment that has not been processed then selecting the at least one information segment in the subset of information that is next in sequence and returning to step (g) for processing, otherwise proceeding to the next step;

i) recording a number of occurrences of each recorded user-definable vector that is unique;

j) determining from the result of step (i) the number of the least occurring user-definable vector;

k) dividing each result of step (i) by the result of step (j);

l) determining an occupation time for each user-definable vector recorded;

m) calculating an inverse characteristic time for each unique user-definable vector as follows:

$$q_i = \frac{\pi_i}{\left(w \sum_{i=1}^{n} t_i\right)}$$

where w is a weighting factor, where $t_i$ is the corresponding result of step (1), and where $\pi_i$ is the corresponding result of step (k);

n) calculating at least one subset value for the subset of information using a function selected from the group of functions consisting of a temperature-based function, an entropy-based function, an energy-based function. and any combination thereof;

o) setting a value $v_i$ for each at least one initial state and each at least one transition state set in steps (c) and (d);

p) calculating a configuration value for each at least one initial state and each at least one transition state set in steps (c) and (d) as follows:

$$Y_i = v_i \times \left(\left(\frac{\pi_i}{q_i}\right) \bigg/ \left(\sum_{i=1}^{n} \frac{\pi_i}{q_i}\right)\right)$$

q) selecting the subset of information that is available and next in sequence and returning to step (g) for further processing, otherwise proceeding to the next step;

r) plotting the results of steps (n) and (p) in a user-definable format that is user-friendly;

s) if there is a difference between the plots of step (r) that is above a user-definable threshold then finding each difference; and t) finding the at least one information segment that corresponds to each difference found in step (s).

2. The method of claim 1, wherein said step of selecting a subset of information from the set of information is comprised of the step of selecting a subset of information from the set of information, where the first subset of information includes at least one information segment in time sequence, and where each at least one information segment includes an initial state and a transition state.

3. The method of claim 1, wherein said step of setting at least one user-definable initial state is comprised of the step of setting at least one user-definable initial state, where each at least one user-definable initial state includes at least one user-definable characteristic selected from the group of characteristics consisting of source, destination, protocol, number of recipients, data type, data value, stimulus type, response type, size, time duration, and any combination thereof.

4. The method of claim 1, wherein said step of setting at least one user-definable transition state is comprised of the step of setting at least one user-definable transition state, where each at least one user-definable transition state includes at least one user-definable characteristic selected from the group of characteristics consisting of source, destination, protocol, number of recipients, data type, data value, stimulus type, response type, size, time duration, and any combination thereof.

5. The method of claim 1, wherein said step of modifying in a user-definable manner the user-definable vector recorded last and recording the modified user-definable vector if the at least one information segment selected in the last step contains both one of the at least one initial state and one of the at least one transition state set in steps (c) and (d) is comprised of the steps of:

a) decrementing the entry in the user-definable vector that corresponds to the at least one user-definable initial state; and b) incrementing the entry in the user-definable vector that corresponds to the at least one user-definable transition state.

6. The method of claim 1, wherein said step of modifying in a user-definable manner the user-definable vector recorded last and recording the modified user-definable vector if the at least one information segment selected in the last step contains both one of the at least one user-definable initial state and one of the at least one user-definable transition state defined in steps (c) and (d) is comprised of the step of incrementing the entry in the user-definable vector that corresponds to the at least one user-definable initial state.

7. The method of claim 1, wherein said step of modifying in a user-definable manner the user-definable vector recorded last and recording the modified user-definable vector if the at least one information segment selected in the last step contains both one of the at least one user-definable initial state and one of the at least one user-definable transition state set in steps (c) and (d) is comprised of the step of incrementing the entry in the user-definable vector that corresponds to the at least one user-definable transition state.

8. The method of claim 1, further including the step of bounding the modified user-definable vector by a mathematical technique selected from the group of mathematical techniques consisting of applying modulo reduction by a positive integer, disallowing any reduction that causes the modified user-definable vector to fall below the value of zero, and applying an absolute value function to the modified user-definable vector.

9. The method of claim 1, wherein said step of determining an occupation time for each user-definable vector recorded is comprised of the step of assigning one unit of time as an occupation time for each user-definable vector recorded.

10. The method of claim 1, wherein said step of determining an occupation time for each user-definable vector recorded is comprised of the step of assigning a time equal to an actual elapsed time between the recorded user-definable vector and the previously recorded user-definable vector.

11. The method of claim 1, wherein said step of determining an occupation time for each user-definable vector recorded is comprised of the step of assigning a time that is a function of an actual elapsed time between the recorded user-definable vector and the previously recorded user-definable vector and the size of the corresponding at least one information segment as an occupation time for each user-definable vector recorded.

12. The method of claim 1, wherein said step of calculating at least one subset value for the subset of information using a function selected from the group of functions consisting of a temperature-based function, an entropy-based function, an energy-based function, and any combination thereof is comprised of the step of calculating at least one subset value for the subset of information using a function selected from the group of functions consisting of a temperature-based function, an entropy-based function, an energy-based function, and any combination thereof, where the entropy based function is as follows:

$$S = \sum_{i=1}^{n} \frac{\left(\frac{\pi_i}{q_i}\right)}{\sum_{i=1}^{n} \left(\frac{\pi_i}{q_i}\right)} \log\left(\frac{\sum_{i=1}^{n} \left(\frac{\pi_i}{q_i}\right)}{\left(\frac{\pi_i}{q_i}\right)}\right)$$

where the energy-based function is as follows:

$$U = T \sum_{i=1}^{n} \frac{\left(\frac{\pi_i}{q_i}\right)}{\sum_{i=1}^{n} \left(\frac{\pi_i}{q_i}\right)} \log\left(\left(\prod_{i=1}^{n} \left(\frac{\pi_i}{q_i}\right)\right)^{1/n} / \left(\frac{\pi_i}{q_i}\right)\right)$$

and where the temperature-based function is as follows:

$$\left(\sum_{i=1}^{n} \left(\frac{\pi_i}{q_i}\right)^{1/\phi}\right) / \sum_{i=1}^{n} \left(\frac{1}{q_i}\right)^{1/\phi} \times \left(\frac{\pi_i}{q_i}\right)^{1/\phi} / \left(\sum_{i=1}^{n} \left(\frac{\pi_i}{q_i}\right)^{1/\phi}\right) =$$

$$\left(\sum_{i=1}^{n} \frac{\pi'_i}{q'_i}\right) / \sum_{i=1}^{n} \frac{1}{q'_i} \times \frac{\pi'_i}{q'_i} / \left(\sum_{i=1}^{n} \left(\frac{\pi'_i}{q'_i}\right)\right).$$

13. Tile method of claim 2, wherein said step of setting at least one user-definable initial state is comprised of the step of setting at least one user-definable initial state, where each at least one user-definable initial state includes at least one user-definable characteristic selected from the group of characteristics consisting of source, destination, protocol, number of recipients, data type, data value, stimulus type, response type, size, time duration, and any combination thereof.

14. The method of claim 13, wherein said step of setting at least one user-definable transition state is comprised of the step of setting at least one user-definable transition state, where each at least one user-definable transition state includes at least one user-definable characteristic selected from the group of characteristics consisting of source, destination, protocol, number of recipients, data type, data value, stimulus type, response type, size, time duration, and any combination thereof.

15. The method of claim 14, wherein said step of modifying in a user-definable manner the user-definable vector recorded last and recording the modified user-definable vector if the at least one information segment selected in the last step contains both one of the at least one initial state and one of the at least one transition state set in steps (c) and (d) is comprised of the steps of:

a) decrementing the entry in the user-definable vector that corresponds to the at least one user-definable initial state; and b) incrementing the entry in the user-definable vector that corresponds to the at least one user-definable transition state.

16. The method of claim 14, wherein said step of modifying in a user-definable manner the user-definable vector recorded last and recording the modified user-definable vector if the at least one information segment selected in the last step contains both one of the at least one user-definable initial state and one of the at least one user-definable transition state defined in steps (c) and (d) is comprised of the step of incrementing the entry in the user-definable vector that corresponds to the at least one user-definable initial state.

17. The method of claim 14, wherein said step of modifying in a user-definable manner the user-definable vector recorded last and recording the modified user-definable vector if the at least one information segment selected in the last step contains both one of the at least one user-definable initial state and one of the at least one user-definable transition state set in steps (c) and (d) is comprised of the step of incrementing the entry in the user-definable vector that corresponds to the at least one user-definable transition state.

18. The method of claim 15, further including the step of bounding the modified user-definable vector by a mathematical technique selected from the group of mathematical techniques consisting of applying modulo reduction by a positive integer, disallowing any reduction that causes the modified user-definable vector to fall below the value of zero, and applying an absolute value function to the modified user-definable vector.

19. The method of claim 18, wherein said step of determining an occupation time for each user-definable vector recorded is comprised of the step of assigning one unit of time as an occupation time for each user-definable vector recorded.

20. The method of claim 18, wherein said step of determining an occupation time for each user-definable vector recorded is comprised of the step of assigning a time equal to an actual elapsed time between the recorded user-definable vector and the previously recorded user-definable vector.

21. The method of claim 18, wherein said step of determining an occupation time for each user-definable vector recorded is comprised of the step of assigning a time that is a function of an actual elapsed time between the recorded user-definable vector and the previously recorded user-definable vector and the size of the corresponding at least one information segment as an occupation time for each user-definable vector recorded.

22. The method of claim 19, wherein said step of calculating at least one subset value for the subset of information using a function selected from the group of functions consisting of a temperature-based function, an entropy-based function, an energy-based function, and any combination thereof is comprised of the step of calculating at least one subset value for the subset of information using a function selected from the group of functions consisting of a temperature-based function, an entropy-based function, an energy-based function, and any combination thereof, where the entropy based function is as follows:

$$S = \sum_{i=1}^{n} \frac{\left(\frac{\pi_i}{q_i}\right)}{\sum_{i=1}^{n} \left(\frac{\pi_i}{q_i}\right)} \log\left(\frac{\sum_{i=1}^{n} \left(\frac{\pi_i}{q_i}\right)}{\left(\frac{\pi_i}{q_i}\right)}\right)$$

where the energy-based function is as follows:

$$U = T \sum_{i=1}^{n} \frac{\left(\frac{\pi_i}{q_i}\right)}{\sum_{i=1}^{n} \left(\frac{\pi_i}{q_i}\right)} \log\left(\left(\prod_{i=1}^{n} \left(\frac{\pi_i}{q_i}\right)\right)^{1/n} \bigg/ \left(\frac{\pi_i}{q_i}\right)\right)$$

and where the temperature-based function is as follows:

$$\left(\sum_{i=1}^{n} \left(\frac{\pi_i}{q_i}\right)^{1/\phi}\right) \bigg/ \sum_{i=1}^{n} \left(\frac{1}{q_i}\right)^{1/\phi} \times \left(\frac{\pi_i}{q_i}\right)^{1/\phi} \bigg/ \left(\sum_{i=1}^{n} \left(\frac{\pi_i}{q_i}\right)^{1/\phi}\right) =$$

$$\left(\sum_{i=1}^{n} \frac{\pi'_i}{q'_i}\right) \bigg/ \sum_{i=1}^{n} \frac{1}{q'_i} \times \frac{\pi'_i}{q'_i} \bigg/ \left(\sum_{i=1}^{n} \left(\frac{\pi'_i}{q'_i}\right)\right).$$

* * * * *